United States Patent
Ramamurthy et al.

(10) Patent No.: US 9,872,187 B1
(45) Date of Patent: Jan. 16, 2018

(54) TRANSMISSION MODE SELECTION BASED ON WIRELESS COMMUNICATION DEVICE INFORMATION

(71) Applicant: Sprint Communications Company L.P., Overland Park, KS (US)

(72) Inventors: Suryanarayanan Ramamurthy, Olathe, KS (US); Jasinder Pal Singh, Olathe, KS (US); Siddharth Oroskar, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 154 days.

(21) Appl. No.: 14/571,606

(22) Filed: Dec. 16, 2014

(51) Int. Cl.
*H04W 24/08* (2009.01)
*H04B 7/06* (2006.01)
*H04B 7/0413* (2017.01)

(52) U.S. Cl.
CPC .......... *H04W 24/08* (2013.01); *H04B 7/0413* (2013.01); *H04B 7/0617* (2013.01)

(58) Field of Classification Search
CPC .... H04B 7/024; H04B 7/0408; H04B 7/0413; H04B 7/0452; H04B 7/0495; H04B 7/0617; H04B 7/0695
See application file for complete search history.

(56) References Cited

U.S. PATENT DOCUMENTS

| 7,574,236 B1* | 8/2009 | Mansour | H04B 7/0413 455/562.1 |
| 9,048,894 B2* | 6/2015 | Wang | H04B 7/043 |
| 2009/0046594 A1* | 2/2009 | Zhou | H04B 7/0452 370/252 |
| 2009/0227249 A1* | 9/2009 | Ylitalo | H04B 7/0408 455/424 |
| 2010/0110981 A1* | 5/2010 | Shao | H04W 76/023 370/328 |
| 2011/0202646 A1 | 8/2011 | Bhatia et al. | |
| 2012/0328034 A1* | 12/2012 | Nabar | H04B 7/0617 375/260 |
| 2014/0086077 A1* | 3/2014 | Safavi | H04W 24/02 370/252 |
| 2015/0189589 A1* | 7/2015 | Legg | H04W 24/10 370/311 |

* cited by examiner

*Primary Examiner* — Yemane Mesfin
*Assistant Examiner* — Peter Chen

(57) ABSTRACT

Examples disclosed herein provide systems, methods, and software to transition signaling formats for a wireless communication device. In one example, a method of operating an eNodeB to transition signaling formats or modes for a wireless communication device includes exchanging first wireless communication signals with the wireless communication device using multiple-input and multiple-output (MIMO) signaling. The method further includes identifying a signal transition event for the wireless communication device and, in response to identifying the signal transition event, determining whether the wireless communication device meets a transition criteria. The method also provides, if the wireless communication device meets the transition criteria, exchanging second wireless communication signals with the wireless communication device using beamforming signaling.

8 Claims, 6 Drawing Sheets

TRANSMISSION MODE SELECTION BASED ON WIRELESS COMMUNICATION DEVICE INFORMATION

TECHNICAL BACKGROUND

Wireless communication networks typically include wireless access systems with equipment such as wireless access, control, and routing nodes that provide wireless communication services for wireless communication devices. A typical wireless communication network includes systems to provide wireless access across a geographic region, with wireless coverage areas associated with individual wireless access nodes. The wireless access systems exchange user communications between wireless communication devices, service providers, and other end user devices. These user communications typically include voice calls, data exchanges, web pages, streaming media, or text messages, among other communication services.

In some communication systems, multiple transmission modes may be used to provide wireless signaling to the various wireless communication devices. Accordingly, a first device that is located in a first location may be provided a first transmission mode from a base station, whereas a second device that is located in a second position may be provided a second transmission mode by the base station. These transmission modes may include multiple-input and multiple-output (MIMO) signaling, which is often used in communications near the base station, and beamforming signaling, which increases transmission power and is often used in communications further away from the base station.

In some instances, as wireless communication devices move within the geographic region supported by the base station, the base station may provide better communication connectivity using beamforming over MIMO signaling. Thus, the devices may prefer to transition from using the MIMO signaling to beamforming signaling to maintain the communication. However, the resources required from the base station to make the transition may be inappropriate for every device and communication.

OVERVIEW

Examples herein provide systems, methods, and software to transition wireless communication devices between signaling formats. In one example, a method of operating an eNodeB to transition signaling formats or modes for a wireless communication device includes exchanging first wireless communication signals with the wireless communication device using multiple-input and multiple-output (MIMO) signaling. The method further includes identifying a signal transition event for the wireless communication device and, in response to identifying the signal transition event, determining whether the wireless communication device meets a transition criteria. The method also provides, if the wireless communication device meets the transition criteria, exchanging second wireless communication signals with the wireless communication device using beamforming signaling.

DETAILED DESCRIPTION

Figure 1:
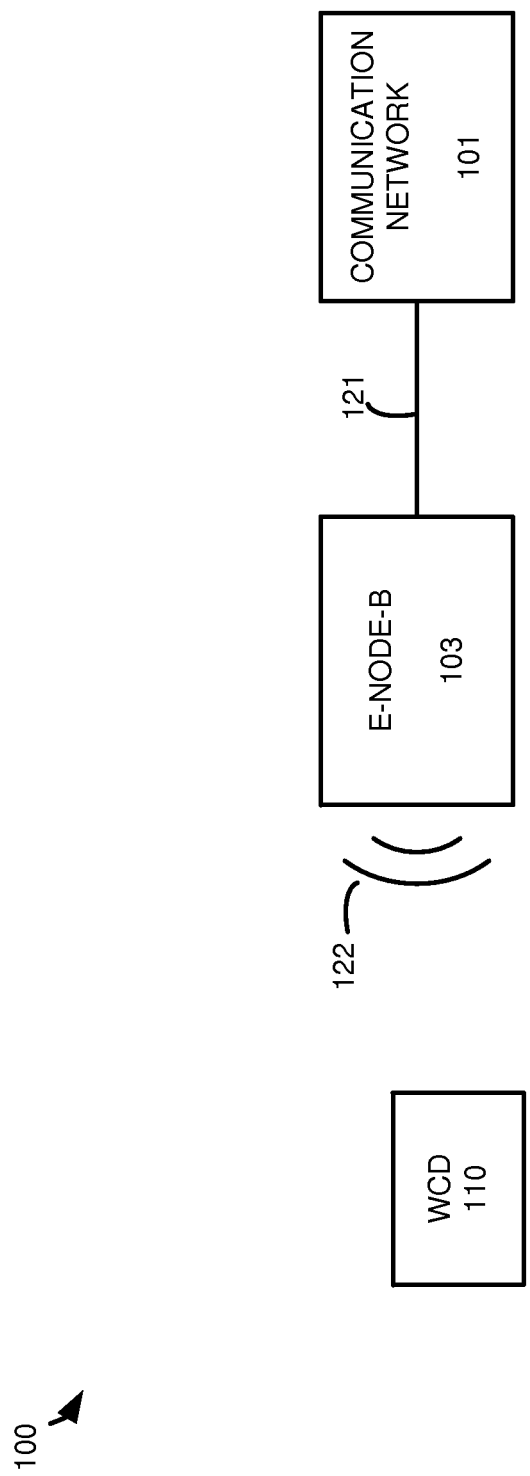
FIG. 1 illustrates a communication system to transition wireless communication devices between signaling formats.

FIG. 1 illustrates a communication system 100 to transition wireless communication devices between signaling formats. Communication system 100 includes wireless communication device (WCD) 110, eNodeB 103, and communication network 101. ENodeB 103 provides wireless sector 122 to WCD 110, and further communicates with communication network 101 via communication link 121.

ENodeB 103 provides wireless communication sector 122 to WCDs, such as WCD 110, allowing WCD 110 to communicate for various applications executing on WCD 110. These applications may include voice applications, internet browsers, instant messaging applications, gaming applications, email application, amongst a variety of other possible applications. In some examples, eNodeB 103 provides various transmission modes or communication signaling formats based on the device and the requirements for the communication. Here, eNodeB 103 communicates using at least multiple-input and multiple-output (MIMO) signaling and beamforming signaling. MIMO signaling uses multiple antennas at both the transmitter and receiver to improve communication performance, and is often used when a WCD is nearer in geographic proximity to eNodeB 103. In contrast, beamforming signaling is the use of multiple transmitting antennas to provide increased power for particular communications, or a summing of the signals from each of the transmitting antennas. As a result of the multiple signaling formats, it may be necessary for eNodeB 103 to transition particular devices from communicating in a first format to communicating in a second format.

For example, WCD 110 may initiate a communication with eNodeB 103 in a location that is associated with MIMO signaling. This MIMO signaling may be initiated as a result of the MIMO signaling having a higher throughput than the beamforming signaling, as a result of the device being in a particular geographic location relative to eNodeB 103, or for any other similar reason. As the communication progresses, a signal transition event may be identified for the communication, which may be based on signal to noise ration of the MIMO signaling, the amount of throughput available to the device, the reference signal received power (RSRP) for the device, or any other similar signal event. In response to the event, eNodeB 103 further identifies whether WCD 110 meets transition criteria to determine if the device is to be transitioned to beamforming signaling.

Figure 2:
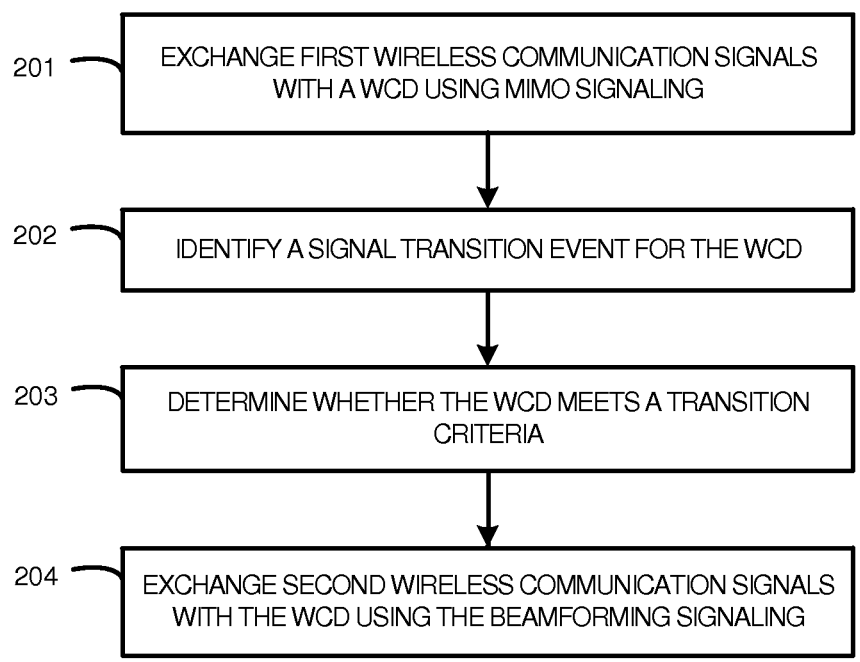
FIG. 2 illustrates a method of operating an eNodeB to transition wireless communication devices between signaling formats.

FIG. 2 illustrates a method of operating eNodeB 103 to transition wireless communication devices between signaling formats. As described in FIG. 1, WCD 110 initiates a communication with eNodeB 103 and exchanges first wireless communication signals using MIMO signaling (201). During this communication, eNodeB 103 identifies a signal transition event for WCD 110 (202). This signal transition event may occur for a variety of reasons including the throughput for MIMO falling below a certain threshold, the signal to noise ratio of the MIMO signaling attaining a predefined signal to noise ratio, the RSRP for the MIMO signaling falling below a certain level, or any other similar transition event. In response to identifying the transition event, eNodeB 103 determines whether WCD 110 meets transition criteria (203), allowing WCD 110 to migrate to beamforming signaling. This transition criteria may be based on the quality of service class identifier (QCI) associated with the communication and the device, the access point name (APN) that is associated with the communication and the device, the application requiring the communication on the device, the quality of service assessed to the user of the device, or any other transition criteria. In some examples, the quality of service assessed to the device includes information regarding the payment habits of the user or level of service selected for WCD 110.

If WCD 110 meets the transition criteria, eNodeB 103 transitions to using the beamforming signaling, and exchanges wireless communication signals with WCD 110 using the beamforming signaling (204). In some examples, transitioning devices to using beamforming can exhaust resources of the eNodeB. Accordingly, rather than transitioning each device that qualifies based on signal criteria, the eNodeB may only transition devices that further qualify based on transition criteria that is separate and distinct from the signal event.

Figure 3:
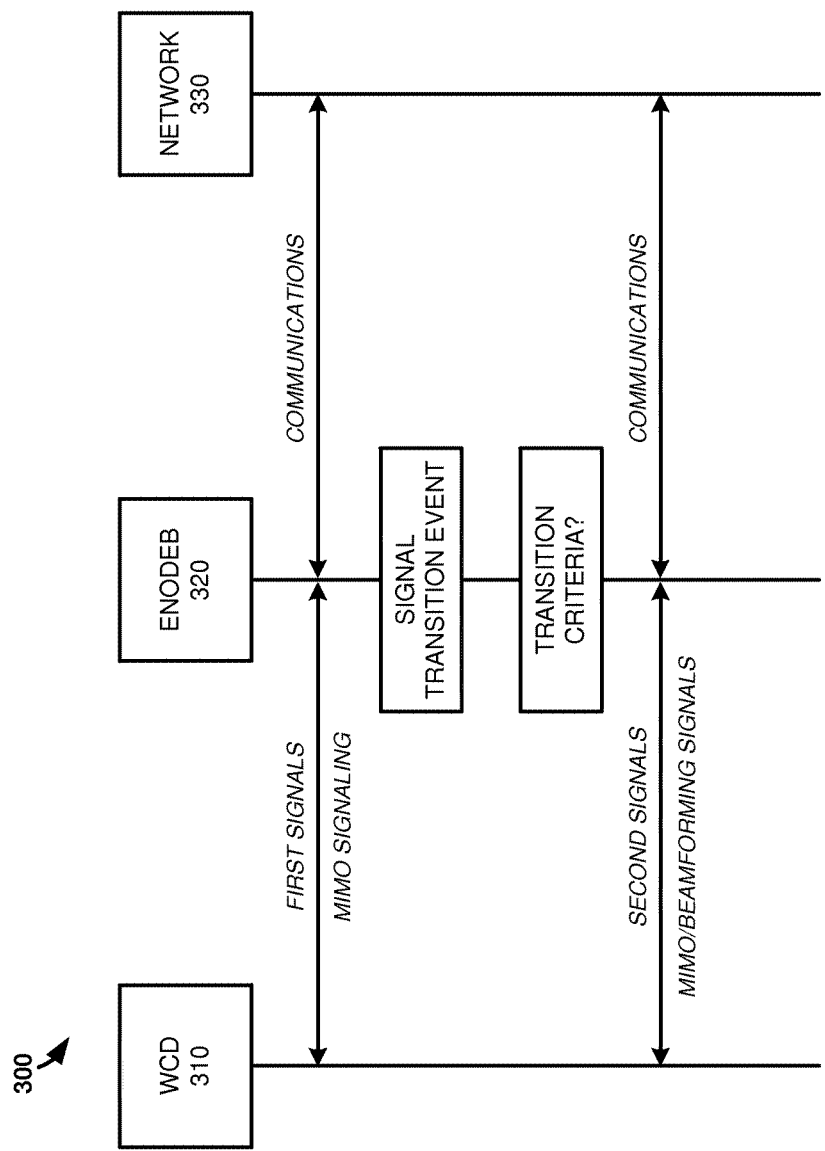
FIG. 3 illustrates a timing diagram demonstrating the transition of a wireless communication device based on transition criteria.

FIG. 3 illustrates a timing diagram 300 demonstrating the transition of a wireless communication device based on transition criteria. Timing diagram 300 includes WCD 310, eNodeB 320, and network 330. In operation, WCD 310 initiates a communication over eNodeB 320 using MIMO signaling to communicate with network 330. These communications may include voice communications, email communications, internet communications, gaming communications, or any other communication for an application or process on WCD 310. As the communication progresses, eNodeB 320 identifies a signal transition event for WCD 310. This signal transition event may include an occurrence of the signal to noise ratio of the MIMO signaling attaining a certain value, the distance of WCD 310 from eNodeB 320 attaining a certain value, the throughput of the MIMO signaling attaining a certain value, the signal to noise ratio of beamforming signaling attaining a certain value, the throughput of beamforming signaling attaining a certain value, the RSRP for the MIMO signaling attaining a certain value, or any other signal related information, including combinations thereof.

Responsive to identifying a signal transition event for WCD 310, eNodeB 320 identifies whether WCD 310 qualifies to transition to beamforming signaling based on transition criteria that is separate and distinct from the signal transition event. This transition criteria may be based on a quality of service associated with WCD 310, may be based on the APN used in the devices communication, may be based on the QCI for the communication, may be based on the application requiring the communication, or may be based on any other similar information specific to WCD 310. If the device does meet the transition criteria, eNodeB 320 may transition the communication to using beamforming signaling, and continue the communication via the beamforming signaling. In contrast, if WCD 310 does not meet the criteria, eNodeB 320 may continue the communication via the MIMO signaling.

For example, WCD 310 may initiate a gaming communication, via MIMO signaling, with one or more devices in network 330 over eNodeB 320. During the communication, WCD 310 may move within the service area provided by eNodeB 320, resulting in eNodeB 320 identifying that the signal to noise ratio or some other signal information for the MIMO signaling qualifies as a transition event. Once the transition event is identified, eNodeB 320 may identify that the gaming application meets a transition criteria, and may transition WCD 310 to communicating via beamingforming signaling.

Figure 4:
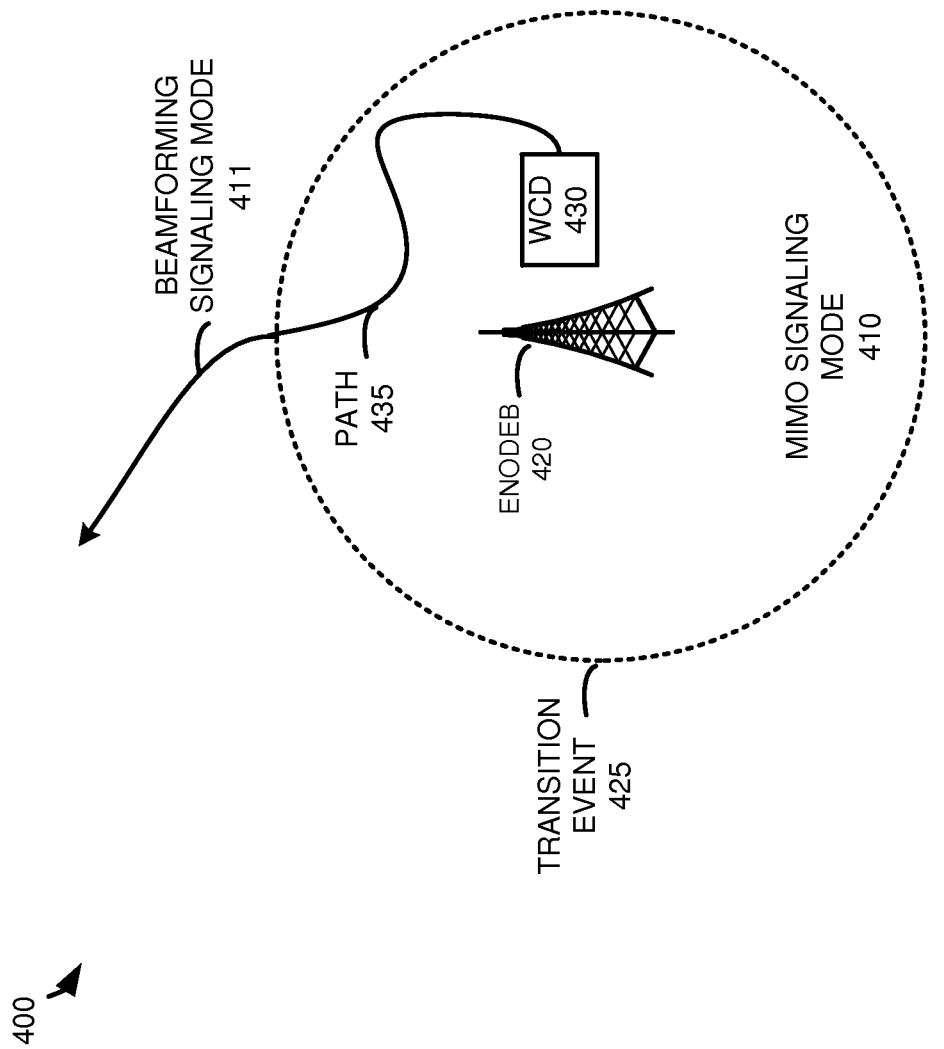
FIG. 4 illustrates an overview of transitioning a wireless communication device between signaling formats.

FIG. 4 illustrates an overview 400 of transitioning a wireless communication device between signaling formats. Overview 400 includes eNodeB 420, which is used to provide wireless communications to devices located in a particular service area, such as WCD 430. As illustrated, WCD 430 initiates a communication with eNodeB 420 to communicate with one or more systems within a communication network, such as servers and other WCDs. Here, eNodeB 420 provides two distinct signaling modes for connecting WCDs, MIMO signaling mode 410, which may comprise transmission mode three (TM3), and beamforming signaling mode 411, which may comprise transmission mode eight (TM8). As illustrated in the present example, when WCD 430 initiates the communication, eNodeB 420 exchanges wireless signals via MIMO signaling mode 410.

During the communication, WCD 430 traverses path 435 and encounters transition event 425. Transition event 425 may occur based on the signal to noise ratio of the MIMO signaling, the distance of WCD 430 from eNodeB 420, the throughput of the MIMO signaling, the signal to noise ratio of beamforming signaling, the throughput of beamforming signaling, or any other signal related information, including combinations thereof. For example, as WCD 430 traverses path 435, eNodeB 420 may identify that the signal to noise ratio for MIMO signaling 410 meets a predetermined threshold, and associates this occurrence with a signal transition event. Once the transition event is identified, eNodeB 420 identifies if the device qualifies or meets a transition criteria that is separate from the signal transition event. This transition criteria may be based on a QCI associated with the communication, the APN associated with the communication, the application used for the communication, a quality of service assessed to WCD 430, or any other similar information associated with the device or the particular communication.

Here, WCD 430 is approved or meets the criteria necessary to transition to beamforming communication. Consequently, when transition event 425 is identified, WCD 430 is transitioned to communicating using beamforming signaling mode 411, and transfers second wireless signals via the new mode.

Although illustrated in the present example as traversing path 435 to trigger transition event 425, it should be understood that transition event 425 might occur in other instances. For example, transition event 425 may occur when more devices attempt to communicate via eNodeB 420 causing a larger signal to noise ratio. Further, although illustrated in the present example as circular, it should be understood that transition events might occur at various distances surrounding eNodeB 420 based on geography, manmade structures, or other similar circumstances, which may change the distance at which transition event 425 occurs from eNodeB 420.

Figure 5:
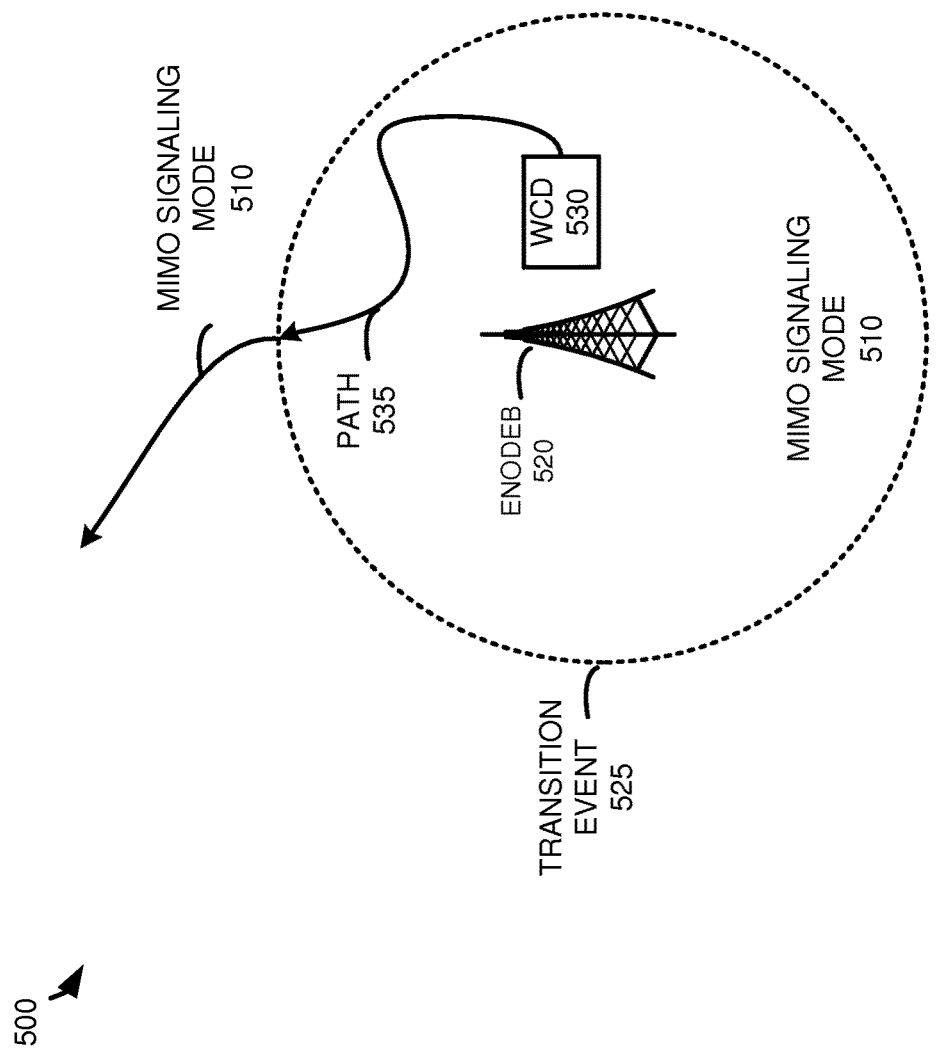
FIG. 5 illustrates an overview of preventing a transition of a wireless communication device between signaling formats.

FIG. 5 illustrates an overview 500 of preventing a transition of a wireless communication device between signaling formats. Overview 500 includes eNodeB 520, which is used to provide wireless communication services to devices, such as WCD 530. Similar to the operations described in FIG. 4, WCD 530 initiates a communication with eNodeB 520 to communicate with other systems in a communication network, such as an internet based server or another WCD. Here, eNodeB 520 may provide two distinct signaling modes for connecting WCDs, MIMO signaling mode 510 and a beamforming signaling mode (not illustrated). As illustrated in the present example, when WCD 530 initiates the communication, eNodeB 520 exchanges wireless signals via MIMO signaling mode 510.

During the communication, WCD 530 traverses path 535 and encounters transition event 525. Transition event 525 may occur based on the signal to noise ratio of the MIMO signaling, the distance of WCD 530 from eNodeB 520, the throughput of the MIMO signaling, the signal to noise ratio of beamforming signaling, the throughput of beamforming signaling, or any other signal related information, including combinations thereof. For example, as WCD 530 traverses path 535, eNodeB 520 may identify that the signal to noise ratio for MIMO signaling 510 meets a predetermined threshold, and associates this occurrence with a signal transition event. Once the transition event is identified, eNodeB 520 identifies if the device qualifies or meets a transition criteria that is separate from the signal transition event. This transition criteria may be based on a QCI associated with the communication, the APN associated with the communication, the application used for the communication, a quality of service assessed to WCD 530, or any other similar information associated with the device or the particular communication.

In this example, WCD 530 does not qualify or meet the requirements of the transition criteria. Thus, rather than using the resources of eNodeB 520 to transition the device to beamforming signaling mode, eNodeB 520 will continue to provide wireless signaling using MIMO signaling mode 510. By continuing to provide WCD 530 with MIMO signaling mode 510, WCD 530 may continue the communication, but not consume the same resources as the beamforming communications.

Although illustrated in the present example as traversing path 535 to trigger transition event 525, it should be understood that transition event 525 might occur in other instances. For example, transition event 525 may occur when more devices attempt to communicate via eNodeB 520 causing a larger signal to noise ratio. Further, although illustrated in the present example as circular, it should be understood that transition events might occur at various distances surrounding eNodeB 520 based on geography, manmade structures, or other similar circumstances, which may change the distance at which transition event 525 occurs from eNodeB 520.

Figures 6, 7:
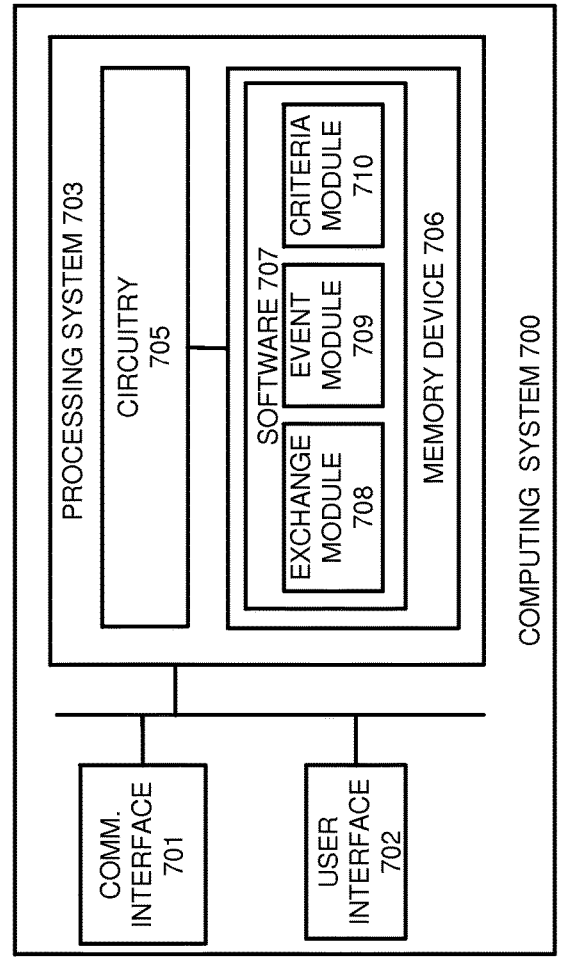
FIG. 6 illustrates a transition information table identifying quality of service class identifiers permitted to transition between signaling formats.
FIG. 7 illustrates a computing system to transition wireless communication devices between signaling formats.

FIG. 6 illustrates a transition information table 600 identifying quality of service class identifiers permitted to transition between signaling formats. Transition information table 600 includes QCIs 610 and transition indicator 620. As described herein, WCDs may communicate over an eNodeB to access the internet, make voice calls, and provide other communication services. During these communications, the eNodeB may initially communicate using MIMO signaling with a WCD, but identify a signal transition event for a possible transition to beamforming signaling.

In response to identifying the signal transition event, the eNodeB attempts to determine whether the device meets criteria that qualify the device to transition to the beamforming signaling. Here, the eNodeB transitions devices based on the QCI associated with the devices communication. For example, when a signal transition event is identified for a device, the eNodeB will identify the QCI associated with the device communication, and compare the communication QCI to QCIs 610 in transition information table 610. If the communication included a QCI of one, indicating a voice over internet protocol communication, the device would not be transitioned to the beamforming mode. In contrast, if the device included a QCI of three for real time online gaming the device may be transitioned to the beamforming mode. Accordingly, rather than using the resources for each of the devices that meet a transition event, only devices that qualify for the QCI criteria will be transitioned from MIMO signaling to beamforming signaling.

In some examples, the approval of transitioning communication devices based on QCI may include transitioning the devices based on guaranteed bit rate (GBR) associated with the QCI. Thus, for the QCIs that have a guaranteed bit rate, such as voice and video calls, real-time online gaming, and video streaming, the device may be transitioned to using beamforming over MIMO signaling. In contrast, a device with a QCI that does not qualify for GBR, such as for transmission control protocol (TCP) based communications, email, interactive gaming, or IP multimedia subsystem (IMS) communications, may not be transitioned from MIMO to beamforming signaling.

Although illustrated as a table in the present example, it should be understood that the criteria might be identified using any other type of data structure including arrays, lists, trees, or any other type of data structure. Further, although QCIs are used in the criteria for FIG. 6, it should be understood that a variety of criteria might be used in place of or in addition to the QCI information. For example an eNodeB might use a quality of service associated with the device, the type of application requiring the communication, the APN associated with the communication, or any other device related information, including combinations thereof. In some instances, the quality of service for the device may be based on a user defined level for the device, the payment habits or history for the device, the payment tier for the device, or any other quality of service determination associated with the device.

FIG. 7 illustrates a computing system 700 to transition wireless communication devices between signaling formats. Computing system 700 is representative of a computing system that may be employed in any computing apparatus, system, or device, or collections thereof, to suitably implement the eNodeB operations described herein. Computing system 700 comprises communication interface 701, user interface 702, and processing system 703. Processing system 703 is communicatively linked to communication interface 701 and user interface 702. Processing system 703 includes processing circuitry 705 and memory device 706 that stores operating software 707.

Communication interface 701 comprises components that communicate over communication links, such as network cards, ports, RF transceivers, processing circuitry and software, or some other communication devices. Communication interface 701 may be configured to communicate over metallic, wireless, or optical links. Communication interface 701 may be configured to use TDM, IP, Ethernet, optical networking, wireless protocols, communication signaling, or some other communication format—including combinations thereof. In particular, communication interface 701 interfaces with one or more WCDs that require communications with other devices, the internet, or other packet based networks. Further, communication interface 701 may communicate with a mobility management entity and gateways that are used to connect the wireless network to the internet and the other packet based networks.

User interface 702 comprises components that interact with a user. User interface 702 may include a keyboard, display screen, mouse, touch pad, or some other user input/output apparatus. User interface 702 may be omitted in some examples.

Processing circuitry 705 comprises microprocessor and other circuitry that retrieves and executes operating software 707 from memory device 706. Memory device 706 comprises a non-transitory storage medium, such as a disk drive, flash drive, data storage circuitry, or some other memory apparatus. Operating software 707 comprises computer programs, firmware, or some other form of machine-readable processing instructions. Operating software 707 includes exchange module 708, event module 709, and criteria module 710, although any number of software modules may provide the same operation. Operating software 707 may further include an operating system, utilities, drivers, network interfaces, applications, or some other type of software. When executed by circuitry 705, operating software 707 directs processing system 703 to operate computing system 700 as described herein.

In particular, exchange module 708, when executed by computing system 700, exchanges first wireless communication signals with a WCD using MIMO signaling. During the communication, event module 709 identifies when signaling for the WCD qualifies as a signal transition event. This signal transition event may occur based on the signal to noise ratio associated with the MIMO signaling meeting a certain value, the reference signal received power (RSRP) associated with the MIMO signaling meeting a certain value, the distance of the WCD from computing system 700 meeting a predefined value, the difference in RSRP between MIMO signaling and beamforming signaling, or any other similar transition event to identify a possible transition from MIMO signaling to beamforming signaling.

In response to identifying the signal transition event, criteria module 710 determines if the WCD meets transition criteria to convert the communication to beamforming signaling mode. The transition criteria may include criteria about a quality of service associated with the device, an APN associated with the device, a QCI associated with the device, an application that is requiring the communication, or any other similar criteria that is distinct from the signal transition event. In some instances, the quality of service associated with the device may comprise information about the paying habits of the user, such as paying on time or paying for a higher quality of service. Once it is determined that the WCD meets the transition criteria, exchange module 708 may exchange second wireless communication signals with the wireless communication device using beamforming signaling. In contrast, if it is determined that the WCD does not meet the transition criteria, exchange module 708 and computing system 700 may continue to communicate with the WCD via the MIMO signaling mode.

As a demonstrative example, criteria module 710 may use the device application requiring a communication as the criteria for transitioning a device from MIMO signaling to beamforming signaling. For instance, a WCD may initiate a communication with computing system 700 using MIMO signaling. During the communication, event module 709 identifies when the MIMO signaling qualifies as a signaling event. Responsive to identifying the signaling event, criteria module 710 identifies the application communicating on the WCD, and compares the application to a predefined set of applications approved for beamforming communication. If the application is included in the predefined set of applications, the communication for the WCD is transitioned to beamforming signaling. In contrast, if the application is not included in the predefined set of applications, the communication for the WCD is continued using MIMO signaling. Accordingly, although a plurality of devices may qualify to transition to beamforming signaling based on signaling events, the number of devices that are actually transitioned are dependent on the approved applications.

Returning to the elements of FIG. 1, WCD 110 comprises Radio Frequency (RF) communication circuitry and an antenna. The RF communication circuitry typically includes an amplifier, filter, modulator, and signal processing circuitry. WCD 110 may also include a user interface, memory device, software, processing circuitry, or some other communication components. WCD 110 may be a telephone, computer, e-book, mobile Internet appliance, wireless network interface card, media player, game console, or some other wireless communication apparatus.

ENodeB 103 comprises RF communication circuitry and at least one antenna to provide Long Term Evolution (LTE) wireless communications. The RF communication circuitry typically includes an amplifier, filter, RF modulator, and signal processing circuitry. ENodeB 103 may also comprise a router, server, memory device, software, processing circuitry, cabling, power supply, network communication interface, structural support, or some other communication apparatus.

Communication network 130 comprises network elements that provide communication services to WCD 110. Communication network 130 may comprise switches, wireless access nodes, Internet routers, network gateways, application servers, computer systems, communication links, or some other type of communication equipment—including combinations thereof. Communication network 130 may comprise the internet, an LTE wireless communication network, as well as other similar communication networks.

Wireless sector 122 includes wireless links that use the air or space as transport media, and communicate with WCD 110 using LTE format. Communication link 121 could use various communication protocols, such as Time Division Multiplex (TDM), Internet Protocol (IP), Ethernet, communication signaling, wireless communication signaling, or some other communication format—including combinations thereof. Communication link 121 could be a direct link or may include intermediate networks, systems, or devices.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a Long-Term Evolution (LTE) eNodeB to transition between Multiple Input Multiple Output (MIMO) Transmission Mode Three (TM3) and beamformed Transmission Mode Eight (TM8), the method comprising:

the LTE eNodeB transferring MIMO TM3 signals to a wireless communication device and detecting when a wireless signal metric for the wireless communication device meets a TM3/TM8 transition threshold;

when the wireless signal metric meets the TM3/TM8 transition threshold, the LTE eNodeB determining whether at least one of an Access Point Name (APN) or a Quality-of-Service Class Identifier (QCI) for the wireless communication device meets a TM3/TM8 transition criteria; and when the APN or the QCI meets the TM3/TM8 transition criteria, the LTE eNodeB transferring beamformed TM8 signals with the wireless communication device.

2. The method of claim 1 wherein the TM3/TM8 transition threshold comprises signal-to-noise ratio.

3. The method of claim 1 wherein the TM3/TM8 transition threshold comprises reference signal received power.

4. The method of claim 1 wherein the TM3/TM8 transition threshold comprises distance to the wireless communication device.

5. A Long-Term Evolution (LTE) computer apparatus to transition between Multiple Input Multiple Output (MIMO) Transmission Mode Three (TM3) and Beamforming Transmission Mode Eight (TM8), the LTE computer apparatus comprising:

processing instructions that direct an eNodeB computer system when executed by the eNodeB computer system to:

transfer MIMO TM3 signals to a wireless communication device and detect when a wireless signal metric for the wireless communication device meets a TM3/TM8 transition threshold;

when the wireless signal metric meets the TM3/TM8 transition threshold, determine whether at least one of an Access Point Name (APN) or a Quality-of-Service Class Identifier (QCI) for the wireless communication device meets a TM3/TM8 transition criteria; and when the APN or the QCI meets the TM3/TM8 transition criteria, transfer beamformed TM8 signals to the wireless communication device; and one or more non-transitory computer readable media that store the processing instructions.

6. The LTE computer apparatus of claim 5 wherein the TM3/TM8 transition threshold comprises a signal-to-noise ratio.

7. The LTE computer apparatus of claim 5 wherein the TM3/TM8 transition threshold comprises reference signal received power.

8. The LTE computer apparatus of claim 5 wherein the a TM3/TM8 transition threshold comprises a distance to the wireless communication device.

* * * * *